United States Patent
Zimmer et al.

(10) Patent No.: US 9,235,707 B2
(45) Date of Patent: Jan. 12, 2016

(54) METHODS AND ARRANGEMENTS TO LAUNCH TRUSTED, COEXISTING ENVIRONMENTS

(71) Applicant: Intel Corporation, Santa Clara, CA (US)

(72) Inventors: Vincent J Zimmer, Federal Way, WA (US); Lyle Cool, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/963,803

(22) Filed: Aug. 9, 2013

(65) Prior Publication Data

US 2013/0326216 A1    Dec. 5, 2013

Related U.S. Application Data

(62) Division of application No. 11/527,180, filed on Sep. 26, 2006, now Pat. No. 8,510,859.

(51) Int. Cl.
*G06F 21/57* (2013.01)
*G06F 9/50* (2006.01)
*G06F 21/53* (2013.01)

(52) U.S. Cl.
CPC .............. *G06F 21/57* (2013.01); *G06F 9/5077* (2013.01); *G06F 21/53* (2013.01); *G06F 21/575* (2013.01)

(58) Field of Classification Search
None
See application file for complete search history.

(56) References Cited

U.S. PATENT DOCUMENTS

| | | | |
|---|---|---|---|
| 5,253,342 A | 10/1993 | Blount et al. | |
| 5,414,852 A | 5/1995 | Kramer et al. | |
| 5,475,826 A | 12/1995 | Fischer | |
| 5,619,658 A | 4/1997 | Priem et al. | |
| 5,694,569 A | 12/1997 | Fischer | |

(Continued)

FOREIGN PATENT DOCUMENTS

| | | |
|---|---|---|
| JP | 2006-323814 A | 11/2006 |
| JP | 2007-257197 A | 10/2007 |
| KR | 100989977 | 10/2010 |

OTHER PUBLICATIONS

Japanese Office Action received for Japanese Patent application No. 2007-273185, mailed on Jan. 18, 2011, 5 pages of Office Action including 2 pages of English Translation.

(Continued)

*Primary Examiner* — David Pearson
(74) *Attorney, Agent, or Firm* — Schubert Law Group PLLC

(57) ABSTRACT

Methods and arrangements to launch trusted, distinct, co-existing environments are disclosed. Embodiments may launch trusted, distinct, co-existing environments in pre-OS space with high assurance. A hardware-enforced isolation scheme may isolate the partitions to facilitate storage and execution of code and data. In many embodiments, the system may launch a partition manager to establish embedded and main partitions. Embedded partitions may not be visible to the main OS and may host critical operations. A main partition may host a general-purpose OS and user applications, and may manage resources that are not assigned to the embedded partitions. Trustworthiness in the launch of the embedded partition is established by comparing integrity metrics for the runtime environment against integrity measurements of a trusted runtime environment for the embedded partition, e.g., by sealing a cryptographic key with the integrity metrics in a trusted platform module. Other embodiments are described and claimed.

16 Claims, 4 Drawing Sheets

(56) References Cited

U.S. PATENT DOCUMENTS

| | | |
|---|---|---|
| 6,035,399 A | 3/2000 | Klemba et al. |
| 6,157,721 A | 12/2000 | Shear et al. |
| 6,189,035 B1 | 2/2001 | Lockhart et al. |
| 6,253,193 B1 | 6/2001 | Ginter et al. |
| 6,292,569 B1 | 9/2001 | Shear et al. |
| 6,363,488 B1 | 3/2002 | Ginter et al. |
| 6,385,645 B1 | 5/2002 | De Jong |
| 6,389,402 B1 | 5/2002 | Ginter et al. |
| 6,425,014 B1 | 7/2002 | Aiken, Jr. et al. |
| 6,792,466 B1 | 9/2004 | Saulpaugh et al. |
| 7,266,810 B2 | 9/2007 | Karkare et al. |
| 7,313,824 B1 | 12/2007 | Bala et al. |
| 7,478,246 B2 | 1/2009 | Arndt et al. |
| 7,543,283 B2 | 6/2009 | Luk et al. |
| 7,548,946 B1 | 6/2009 | Saulpaugh et al. |
| 7,552,419 B2 | 6/2009 | Zimmer et al. |
| 7,571,312 B2 | 8/2009 | Scarlata et al. |
| 7,574,610 B2 | 8/2009 | Willman et al. |
| 7,581,097 B2 | 8/2009 | Catherman et al. |
| 7,587,595 B2 | 9/2009 | Scarlata et al. |
| 7,774,588 B2 | 8/2010 | Samba et al. |
| 2003/0061494 A1 | 3/2003 | Girard et al. |
| 2005/0081065 A1 | 4/2005 | Brickell et al. |
| 2005/0138370 A1 | 6/2005 | Goud et al. |
| 2005/0138434 A1 | 6/2005 | Catherman et al. |
| 2005/0210467 A1 | 9/2005 | Zimmer et al. |
| 2006/0015717 A1 | 1/2006 | Liu et al. |
| 2006/0026419 A1 | 2/2006 | Arndt et al. |
| 2006/0075264 A1 | 4/2006 | Willman et al. |
| 2006/0146057 A1 | 7/2006 | Blythe |
| 2006/0179302 A1 | 8/2006 | Hatakeyama |
| 2006/0256105 A1 | 11/2006 | Scarlata et al. |
| 2006/0256106 A1 | 11/2006 | Scarlata et al. |
| 2006/0256107 A1 | 11/2006 | Scarlata et al. |
| 2006/0256108 A1 | 11/2006 | Scaralata et al. |
| 2007/0016766 A1 | 1/2007 | Richmond et al. |
| 2007/0094719 A1 | 4/2007 | Scarlata |
| 2008/0069361 A1 | 3/2008 | Cho et al. |
| 2008/0077993 A1 | 3/2008 | Zimmer et al. |
| 2008/0155702 A1 | 6/2008 | Bala et al. |
| 2008/0159541 A1 | 7/2008 | Kumar et al. |
| 2008/0163209 A1 | 7/2008 | Rozas et al. |
| 2008/0163383 A1 | 7/2008 | Kumar et al. |
| 2008/0235534 A1 | 9/2008 | Schunter et al. |
| 2008/0235754 A1 | 9/2008 | Wiseman et al. |
| 2008/0235793 A1 | 9/2008 | Schunter et al. |
| 2008/0244292 A1 | 10/2008 | Kumar et al. |
| 2009/0044187 A1 | 2/2009 | Smith et al. |
| 2009/0089582 A1 | 4/2009 | Brutch et al. |
| 2009/0165117 A1 | 6/2009 | Brutch et al. |
| 2009/0172639 A1 | 7/2009 | Natu et al. |

OTHER PUBLICATIONS

Chinese Office Action Received for Chinese Patent Application No. 2007101537964, mailed on May 22, 2009,6 Pages of Office Action including 2 pages of English Translation.

Korean Office Action Received Korean Patent Application No. 10-2007-0097608, mailed on May 18, 2009, 11 Pages including 5 pages of English Translation.

Korean Office Action Received Korean Patent Application No. 10-2007-0097608, mailed on Dec. 17, 2009, 4 Pages including 2 pages of English Translation.

European Office Action Received for European Patent Application No. 07253768.1, Mailed on Oct. 26, 2012, 4 pages.

Office Action Received for Chinese Patent Application No. 200710153796.4, mailed on Sep. 1, 2011, 3 pages of Office Action and 1 page of English Translation.

Office Action Received for European Patent Application No. 07253768.1, mailed on Nov. 15, 2010 2 pages.

Office Action Received for Chinese Patent Application No. 200710153796.4, mailed on Nov. 29, 2010,8 Pages of Office Action and 14 Pages of English Translation.

Letters Patent Received for Korean Patent Application No. 1 0-2007-97608, issued on Oct. 19, 2010.

Berger et al.,"IBM Research Report RC23879, vTPM: Virtualizing the Trusted Platform Module," IBM Research Report No. RC23879, Feb. 14, 2006, pp. 1-18.

European Search Report received for European Patent Application No. 07253768.1, mailed Oct. 7, 2010, 7 pgs.

European Office Action Received for European Patent Application No. 07253768.1, Mailed on Mar. 19, 2013, 4 pages.

METHODS AND ARRANGEMENTS TO LAUNCH TRUSTED, COEXISTING ENVIRONMENTS

FIELD

The present invention is in the field of the computer security. More particularly, the present invention relates to methods and arrangements to launch two or more trusted, distinct, co-existing environments.

BACKGROUND

Data stored on computers may have high value in monetary terms and/or in relation to an ability to compete or do business. The data may include trade secrets such as decryption codes and secret processes as well as other confidential business data or personal information such as social security numbers and credit card numbers. With the aim of enhancing the security of such data in disparate processing systems, the Trusted Computing Group (TCG), a not-for-profit industry-standards organization, has formed and adopted specifications for more secure computing environments. TCG specifications include, for instance, TCG trusted platform module (TPM) Specification Version 1.2 Revision 94, Part I Design Principles, dated Mar. 29, 2006, and TCG Main Specification Version 1.1b, dated TCG Main Specification Version 1.1b.

TCG specifications define trusted processing systems, or platforms, generally as processing systems that will behave in a particular manner for a specific purpose. A trusted processing system may provide data security functions such as data encryption, decryption and storage. A key component of a trusted processing system is the TPM, a module which may perform cryptographic hashings to detect loss of integrity, public and secret key encryption to prevent unauthorized disclosure of data, and digital signing to authenticate transmitted information. The TCG Protected Storage mechanisms, which may be rooted in hardware, may protect keys, secrets and hash values.

Integrity metrics for a trusted processing system facilitate a determination regarding whether a processing system operates in a safe, or "trusted", configuration of hardware and software when it has access to sensitive data. Integrity metrics may be established by measuring the runtime configuration of the processing system at a point at which the configuration can be trusted, such as at the time of manufacture, and sealing the sensitive data to that configuration. Furthermore, measurements and demonstrations for trustworthiness are implemented in hardware with authenticated or trusted code. The hardware such as processor(s), chipsets, and TPMs may include functionality to assure that certain transactions may only be initiated by the authenticated code and may verify that the code is not tampered with or compromised via measurement of integrity metrics. Trustworthiness is typically established upon boot or reset of the processing system by establishing a protected core of data and code prior to booting the OS. Each time the processing system is powered down or reset, the protected core is reinitialized and authenticated minimize an attacker's ability to compromise protected data by changing the code when the processing system is powered down or reset. Establishing the protected core prior to booting the OS is also a security measure to minimize an attacker's ability to tamper with the security protocols.

In a typical processing system, firmware provides the machine instructions that control the pre-OS, or pre-boot, operations of the system between powering-up/resetting the processing system and booting of an operating system (OS) on the processing system. The OS then takes over primary functionality of the processing system. For instance, in some systems a virtual machine monitor (VMM) or hypervisor code may assume control of over the system's resources such as central processing units (CPUs), memory, hard drives, and other components. The VMM can launch and manage virtual environments and launch a higher-level OS, such as Microsoft™ Windows, Linux™, Unix™, etc., in each of the virtual environments.

Firmware may also control certain operations after the OS has been loaded, referred to as post-boot operations, such as operations for handling certain hardware events and/or system interrupts. More specifically, firmware may handle pre-boot and post-boot operations through a set of routines referred to collectively as a basic input/output system (BIOS). The BIOS thus provides the interface between the hardware components of the system and software components such as the OS. A couple of newer alternatives for BIOS include version 1.10 of the extensible firmware interface (EFI) Specification, dated Dec. 1, 2002, and version 2.0 of the Unified EFI (UEFI) Specification, dated Jan. 31, 2006.

After establishing a protected core, firmware such as BIOS, EFI, or UEFI can measure the current runtime configuration of the processing system and compare the current runtime configuration against the runtime of the trusted configuration in the TPM. If the integrity of the current runtime configuration is compromised or otherwise changed, access to the sensitive data can be denied or ignored. Furthermore, a trusted processing system may allow access to the sensitive data if the runtime configuration at the time of the access is sufficiently similar to the runtime of the trusted configuration to be trustworthy.

While the protected core offers hardware-based security for data and code, more is needed. The proliferation of services offered via networks and the Internet continues to increase the needs for protection and execution of processes not only from a rogue user or software virus but also from one another. In other words, a single protected core or partition on a processing system is insufficient. Furthermore, while the current trend is moving toward larger numbers of processor cores in processing systems, current OS software cannot readily scale beyond eight processor cores.

A current solution is to launch a protected core managed by the firmware and then launch and secure additional partitions via the VMM. The VMM is a low-level OS that offers control of platform partitioning at a logical level. The VMM can leverage many OS runtimes across a number of processor cores, offering several runtime environments in different partitions. However, the VMM can only handle up to eight cores and the security for the additional partitions is dependent upon the VMM, which is a low-level OS not firmware. The VMM controls software loads for the additional partitions rather than firmware and, e.g., the TPM. Thus, sensitive data may be compromised if an attacker takes the hard disk and hacks the VMM.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

Figure 1:
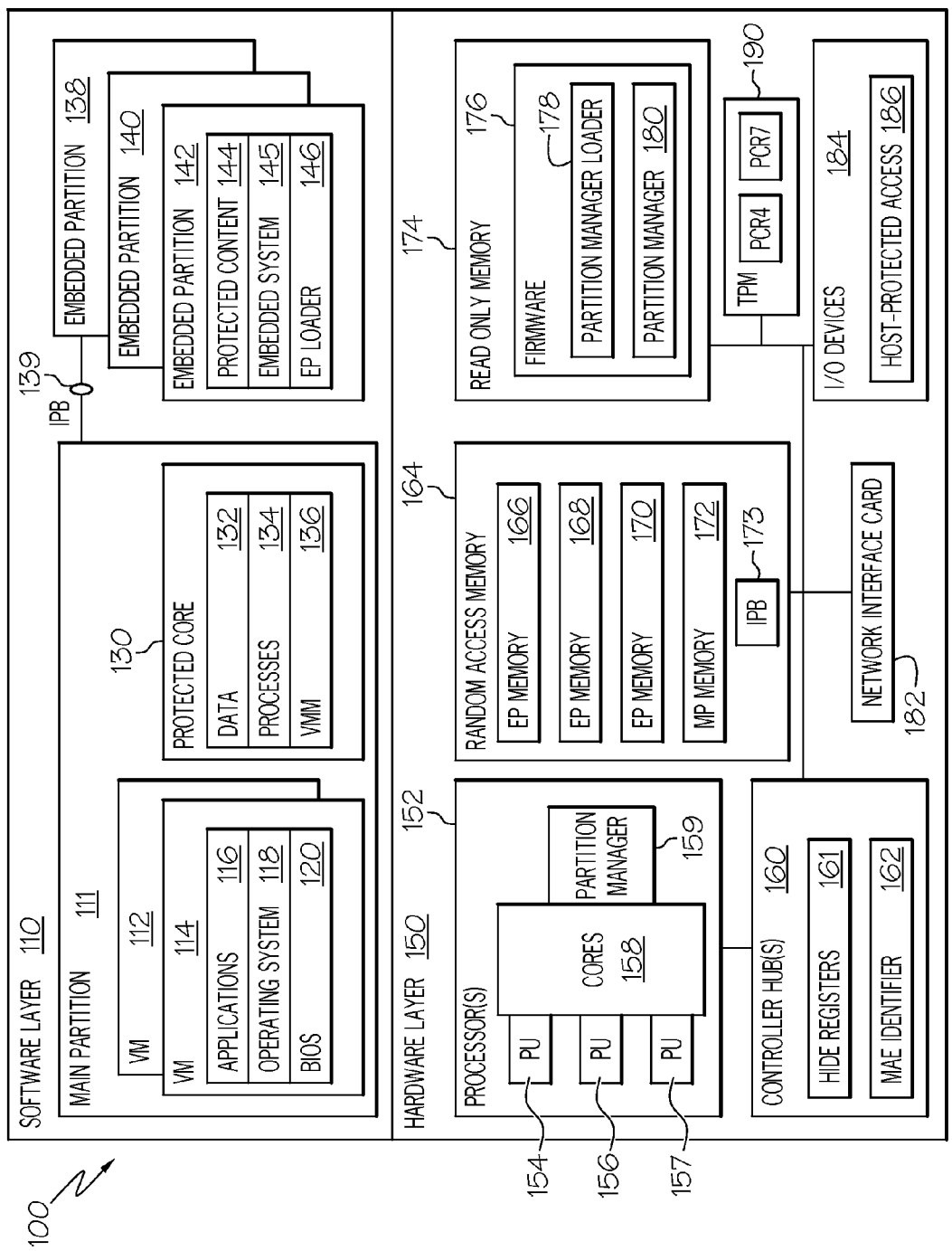
FIG. 1 depicts an embodiment of a system including one or more processors, memory, a TPM, and other hardware resources with firmware/microcode to launch one or more trusted, embedded environments prior to launching a trusted, main environment.

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to launch two or more trusted, distinct, co-existing environments are contemplated. Embodiments may launch two or more trusted, co-existing environments in pre-OS space with high assurance. Each trusted environment or partition may be assigned hardware resources that are isolated from other processing system resources via a hardware-enforced isolation scheme to facilitate storage and execution of code and data. In many embodiments, the system may launch a partition manager to establish embedded and main partitions. Embedded or sequestered partitions may not be visible to the main OS and may be used for a wide variety of applications such as host critical operations, I/O offloading, soft peripherals, platform manageability, and/or fault prediction. For instance, an embedded partition may include a runtime for, e.g., EFI, embedded Linux®, Microsoft® Windows® Compact Edition (WinCE), other Real Time Operating Systems (RTOS), and etc., to host critical operations such as a personal video recorder or set-top box, which must vet for premium content download. Trustworthiness in the launch of the embedded partition is established by comparing integrity metrics for the runtime environment against integrity measurements of a trusted runtime environment for the embedded partition.

Upon establishing trustworthiness, content for the embedded partition may be unsealed and additional embedded partitions may be launched before invocation of a main partition. The main partition may host a general purpose OS (e.g., one of the various Windows®-based OSs, a Linux®-based OS, etc.) and one or more user applications (e.g., a web server, a business application, etc.). Trustworthiness may also be established in the launch of the main partition by, e.g., executing authenticated code via firmware and measuring trustworthiness of critical commands with the authenticated code and trusted hardware during operation via, e.g., a trusted platform module (TPM).

In some embodiments, the embedded and the main partitions may not interact. In other words, operations performed by the embedded partition(s) may be independent of operations in the main partition. For example, an embedded partition may act like a "hardware device" such as a network circuit-breaker or a hardware firewall.

However, in other embodiments, a main partition may be communicatively coupled with an embedded partition via a communication channel such as an Inter-Partition Bridge (IPB). The IPB may be a trusted channel of communication that allows two trusted partitions or sub-systems to communicate in accordance with an expected security policy such as cryptographic keys. In several embodiments, the IPB may comprise a shared memory buffer.

Several embodiments implement the platform resource layer (PRL) via a partition manager to configure partitions, hiding resources such as processor units, random access memory (RAM) units, peripheral devices, integrated devices, and the like, from other partitions. In some embodiments, the partition manager may hide resources in accordance with a hardware-enforced isolation scheme by, e.g., modifying the advanced configuration and power interface (ACPI) tables produced by the BIOS, EFI, UEFI, or other firmware. In further embodiments, the partition manager may hide resources from the OS, e.g., by updating device-hide registers or other locations in the system's input/output (I/O) controller hub (ICH). In other embodiments, an embedded partition loader (EP loader) code will be executed by the partition manager and the EP loader code may hide resources as necessary and, upon authentication of the EP loader code, load protected data into the hidden resources.

While portions of the following detailed discussion describes embodiments with reference to specific configurations and protocols for buses, hardware, software, and other logic, persons of ordinary skill in the art will recognize that embodiments may be implemented with other configurations and in accordance with other protocols to accomplish substantially the same functionality.

Turning now to the drawings, FIG. 1 illustrates an embodiment of a processing system 100 in the form of a software layer 110 with runtime environments and a hardware layer 150 with various hardware resources. System 100 is a computer system such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing or transmitting information. Similar embodiments are implemented as, e.g., entertainment devices such as a portable music player or a portable video player, a smart phone or other cellular phone, a telephone, a digital video camera, a digital still camera, an external storage device, or the like. Further embodiments implement larger scale server configurations such as server systems.

With respect to software layer 110, system 100 may establish via partition manager 180 or 159 one or more trusted, coexisting embedded partitions such as embedded partitions 138, 140, and 142. Partition manager 180 or 159 may establish the embedded partitions prior to launching virtual machine monitor (VMM) 136 in a main partition 111 in response to a system boot or reset.

Embedded partitions such as embedded partitions 138, 140, and 142 may utilize processor cores that would not otherwise be used or might be used less efficiently by VMM 136. For instance, for processing systems in which the number of processor cores exceed eight, VMM 136 may be unable to efficiently utilize more than eight cores so eight cores may be allocated to main partition 111 for VMM 136 and the remainder of the cores may be allocated to embedded partitions.

In many embodiments, partition manager 159 or 180 may hide or sequester the embedded partitions 138, 140, and 142 from main partition 111. In particular, partition manager 159 or 180 may hide the hardware resources of the embedded partitions 138, 140, and 142 so those resources are not discoverable by VMM 136.

While embedded partitions 138, 140, and 142 may operate independently from main partition 111, some embodiments offer communication channels between one or more of the embedded partitions and main partition 111. In the present embodiment, the embedded partitions such as embedded partition 138 may communicatively couple with main partition 111 via an inter-partition bridge (IPB) 139. IPB 139 may be a secured or an unsecured channel for communication and may be implemented via hardware such as input-output (I/O) and memory controller hubs or may be a shared memory buffer 173.

Embedded partitions such as embedded partitions 138, 140, and 142 may perform a variety of functions. For example, in some embodiments, embedded partition 142 may be sequestered and may host critical operations such as a personal video recorder or set-top box, which must vet for premium content download. In such embodiments, the processes of protected content 144, which execute within embedded partition 142, may authorize the premium content. Such processes may authorize the premium content internally via the content of host-protected access (HPA) 186 or via secured communications with a remote system via network interface card (NIC) 182.

Embedded partition 142 illustrates an example of the types of software layers that may be present in embedded partitions. In particular, embedded partition 142 comprises protected content 144, embedded system 145, and EP loader 146. Protected content 144 may be content decrypted from HPA 186 upon verification of integrity metrics of the runtime environment of embedded partition 142. The runtime environment of embedded partition 142 may comprise hardware configurations and software configurations associated with embedded partition 142. For example, the runtime environment of embedded partition 142 may comprise EP loader 146 as well as hardware resources such as processor unit (PU) 157 and EP memory 170, which are assigned exclusively to embedded partition 142. In some embodiments, a partition manager such as partition manager 180 or partition manager 159 will load embedded system 145, avoiding the need for a separate EP loader 146.

EP loader 146 may load embedded system 145 from I/O devices 184 and release control to embedded system 145. Embedded system 145 may comprise embedded Linux®, Microsoft® Windows® Compact Edition (WinCE), other Real Time Operating Systems (RTOS), to host operations within embedded partition 142. In other embodiments, embedded system 145 may comprise a specialized software designed to perform specific functionality. For instance, embedded system 145 may comprise software to emulate a graphics accelerator card.

Embedded system 145 may consist of a monolithic package of instructions that is loaded into embedded partition 142 and then provides all or substantially all of the services or functions to be performed by embedded partition 142. For purposes of this disclosure, an embedded system is software that provides the kind of services which are typically provided by a conventional OS (e.g., task scheduling, error handling, I/O services, etc.), as well as services that are typically provided by system firmware (e.g., the discovery and initialization of hardware components, the provision of software interfaces to those components, etc). An embedded system may also provide services that are typically provided by programs or applications that run on top of an OS.

Once embedded system 145 is loaded, EP loader 146 may request access to protected content 144, which may be stored in HPA 186 or other protected data storage. A trusted platform module (TPM) 190 may hold a cryptographic key to access protected content 144 as stored in HPA 186 and may verify integrity metrics of the runtime environment of embedded partition 142 prior to releasing the cryptographic key. TPM 190 may comprise cryptographic keys for each of the embedded partitions for system 100 as well as one or more keys associated with establishing a protected core 130 in main partition 111.

In many embodiments, TPM 190 may respond to a request for a key for embedded partition 142 by measuring integrity metrics of the runtime environment of embedded partition 142. In some embodiments, TPM 190 may also make additional measurements of integrity metrics for system 100. The integrity metrics may comprise, e.g., a hash of an image of the runtime environment of embedded partition 142 and system 100 more generally. The measured or current integrity metrics for embedded partition 142 may be extended into a platform configuration register seven (PCR7). PCR7 may be utilized in many embodiments because PCR7 is a register in which the content is designated for manufacture control or use. TPM 190 may respond to the extension by hashing the integrity metrics with the content of the PCR7.

PCR7 may comprise a hash of a trusted image of the runtime environment for embedded partition 142. For example, hardware layer 150 may comprise MAE identifier 162 to identify a signal or a short that may be indicative of a manufacturer approved environment (MAE). TPM 190 may recognize the existence of the manufacturer approved environment and, rather than unsealing a key in response to an extension of the integrity metrics for embedded partition 142 into PCR7, TPM 190 may generate and seal a key for embedded partition 142 with the integrity metrics. In some embodiments, EP loader 146 may then encrypt protected content 144 in HPA 186 with the key or a corresponding asymmetric key.

When MAE identifier 162 does not indicate that system 100 is in a manufacturer approved environment, the integrity metrics for embedded partition 142 may be hashed with the contents of PCR7 to determine whether the runtime environment of embedded partition 142 is trustworthy or otherwise authenticated. If the hash of the runtime environment of embedded partition 142 verifies the integrity of the environment then TPM 190 provides the key for protected content 144 in HPA 186 to EP loader 146. EP loader 146 may then load portions of or all of the data and processes stored in HPA 186 into EP memory 170. On the other hand, if the hash indicates that the runtime environment is compromised, TPM 190 may not unseal the key. Furthermore, partition manager 159 or 180 may launch embedded partitions 138 and 140 in a similar manner substantially simultaneously or in accordance with a defined sequence.

Main partition 111 may host a protected core 130 with a trusted OS kernel such as VMM 136 and one or more virtual machines (VMs) such as VMs 112 and 114. In other embodiments, the trusted OS kernel may be a trusted portion of OS 118 and there may be only one OS runtime environment in main partition 111.

Partition manager 159 or 180 may establish trustworthiness in the launch of the runtime environment for protected core 130 of main partition 111 by authenticating code of VMM 136 via TPM 190 or by measuring integrity metrics of the runtime environment and comparing the integrity metrics to trusted integrity metrics stored in TPM 190. For instance, the hardware environment for main partition 111 may be the remainder of the hardware resources available after assigning resources to the embedded partitions. Partition manager 159 or 180 may authenticate VMM 136 via TPM 190 and receive a key from TPM 190 to decrypt data 132 and processes 134.

Data 132 and processes 134 may reside in HPA 186 until decrypted and loaded into MP memory 172.

VMM 136 is a low-level OS that offers control of platform partitioning at a logical level. In particular, VMM 136 may establish and manage a number of VMs such as VMs 112 and 114. VMM 136 controls software loads for the additional partitions. In many embodiments, VMM 136 may offer security in the VMs by authenticating code and runtime environments via a virtual TPM. The virtual TPM may reside in protected core 130 as data 132 and processes 134. In some embodiments, one or more of the embedded partitions such as embedded partition 140 may host a VMM with one or more VMs. In such embodiments, embedded partition 140 may appear to be a distinct, trusted processing system from main partition 111 that coexists in system 100 but is isolated from main partition 111 via a hardware-based isolation scheme. Such embodiments may efficiently utilize a number of processing cores beyond which a general purpose OS such as OS 118 can easily scale.

Upon configuring VM 114, VMM 136 may load a basic input-output system (BIOS) 120. VMM 136 may then verify the integrity of VM 114 and pass control over software loading to BIOS 120. BIOS 120 may launch OS 118. Each VM can leverage an OS runtime across a number of cores 158, offering several runtime environments in different partitions. For example, VM 114 may host a general purpose OS 118 (e.g., one of the various Windows®-based OSs, a Linux®-based OS, etc.) and one or more user applications 116 (e.g., a web server, a business application, etc.). VM 112 may host similar software.

Hardware layer 150 comprises processor(s) 152, controller hub(s) 160 coupled with random access memory (RAM) 164, read only memory (ROM) 174, a network interface card (NIC) 182, input-output (I/O) devices 184, and TPM 190. Processor(s) 152 represent one or more processors for a system such as Intel®'s Pentium® processors, Xeon® processors, Itanium® processors, Celeron® processors, or the like. In the present embodiment, processor(s) 152 comprise multiple processing units, such as processing unit (PU) 154, processing unit 156, and processing unit 157. Processing units 154, 156, and 157 are physical or logical assignments of processing capabilities to embedded partitions 138, 140, and 142. In some embodiments, for instance, processing unit 154 may represent one or more of cores dedicated for usage by the embedded partition 138. Processing unit 156 may represent a logical unit such as a hyper-thread. Main partition 111 may generally manage cores 158 to the extent that they are not hidden or sequestered for embedded partitions 138, 140, and 142.

Cores 158 may comprise partition manager 159 as microcode. Note that many embodiments comprise either a partition manager in firmware 176 of system 100 such as partition manager 180 or a partition manager in microcode of a processor such as partition manager 159. On the other hand, some embodiments may comprise both. Utilization of the partition manager 180 is often referred to as a static root of trust for measurement (SRTM) while utilization of the partition manager 159 is often referred to as a dynamic root of trust for measurement (DRTM).

For SRTM, a chain of trust that is started by computer system reset or reboot, which places processor(s) 152 in a known state. The first code executed, the core root of trust for measurement (CRTM), such as partition manager loader 178, measures the next code to be executed, partition manager 180. Once trust is lost such as by recognition of compromised or unknown code, system 100 may be rebooted or reset to regain trust in system 100.

On the other hand, DRTM uses new processor instructions to put a core of processor(s) 152 in a known state. Code to be executed is sent to TPM to be measured into a special platform configuration register (PCR), which is accessible only when in the DRTM initialization state and only by one or more cores of the processor(s) 152. Initial, measured DRTM code is protected by hardware. Furthermore, with DRTM, if trust is lost, system 100 can restart the chain of trust without rebooting.

Processor(s) 152 communicatively couple with RAM 164, ROM 174, NIC 182, I/O devices 184, and TPM 190 via buses and controller hub(s) 160. Processor(s) 152 may also be communicatively coupled with additional components (not shown) of hardware layer 150, such as one or more video controllers, SCSI controllers, network controllers, universal serial bus (USB) controllers, I/O ports, input devices such as a camera, etc. Furthermore, hardware layer 150 may include one or more bridges, such as a peripheral component interconnect (PCI) root bridge, etc., for communicatively coupling system components. As used herein, the term "bus" includes pathways that may be shared by more than two devices, as well as point-to-point pathways.

Controller hub(s) 160 represent a chipset such as Intel®'s 975X Express Chipset, 865P Chipset, 845G Chipset, 855GM Chipset, E7525 Chipset, E8870 Chipset, 852GME Chipset, 537EP Chipset, 854 Chipset, or the like. For instance, controller hub(s) 160 may comprise a memory controller hub and an I/O controller hub.

In the present embodiment, controller hub(s) 160 comprise hide registers 161 and MAE identifier 162. Hide registers 161 may comprise registers used to hide hardware resources of hardware layer 150 for embedded partitions. For example, random access memory for each of the embedded partitions (EP memories 166, 168, and 170) may be hidden by storing a bit or other indicator in hide registers 161. IPB 173 and hardware used for other functionality may also be hidden. Hiding EP memory 166 may, for instance, prevent any partition other than embedded partition 138 from recognizing the existence of that portion of RAM 164.

In some embodiments, controller hub(s) 160 may use configuration constructs to block configuration cycles for certain devices to hide those devices. In further embodiments, ACPI parameters for main partition 111 may be used to hide processing units and one or more portions of RAM 164 from OS 118, while ACPI parameters for embedded partitions such as embedded partitions 138, 140, and 142 may be used to hide processing units and other portions of RAM 164 from embedded systems such as embedded system 145. Additional details about device hide registers and related topics may be obtained from the Intel® I/O Controller Hub 6 (ICH6) Family Datasheet, dated January 2004 (the "ICH6 datasheet"). The ICH6 datasheet may be obtained from http://www.intel.com/design/chipsets/datashts/301473.htm. Additional details about ACPI parameters and related topics may be obtained from Revision 3.0a of the Advanced Configuration And Power Interface Specification, dated Dec. 30, 2005 (the "ACPI specification"). The ACPI specification may be obtained from www.acpi.info/spec.htm.

In alternative embodiments, other data storage constructs within one or more components may be used to disable or hide devices within a processing system, and other techniques may be used to hide processing units 154, 156, and 157, and portions of RAM 164.

RAM 164 may be system memory supporting execution of instructions by processors 152 by storing data and instructions related to applications such as applications, drivers, and other code. RAM 164 may be composed of one or more memory modules and controller hub(s) 160 may include a memory controller with logic for mapping addresses to particular areas of RAM 164. RAM 164 comprises EP memories 166, 168, and 170, MP memory 172, and IPB 173. RAM 164 may also comprise memory reserved or dedicated for other functionality.

ROM 174 may be one or more memory modules of protected storage for firmware 176 and, in some embodiments, other functionality. ROM 174 may include memory or storage such as flash memory, electrically erasable programmable read only memory (EEPROM), magnetic RAM (MRAM), ferroelectric RAM (FeRAM), or the like. Firmware 176 may store code such as partition manager loader 178 and partition manager 180. Partition manager loader 178 may comprise a trusted core loader initiated at boot or reset of system 100 to load and verify the integrity of partition manager 180.

TPM 190 may be a microcontroller that can store secured information. TPM 190 may comprise a chip embedded on the motherboard of system 100 that can be used to authenticate a hardware device or code. TPM 190 offers facilities for secure generation of cryptographic keys, the abilities to limit the use of keys (to either signing/verification or encryption/decryption), as well as a hardware-based random number generator. Features of TPM 190 may comprise remote attestation, binding, and sealing. Remote attestation may comprise measurement of a runtime environment to create a substantially unforgeable summary of the runtime environment to allow a third party such as a premium content provider to verify that the runtime environment has not been compromised. Sealing may encrypt data in a way that prevents the data from being decrypted unless the runtime environment is substantially the same at the time of decryption. And binding may encrypt data using the TPM Endorsement Key, which may be a unique RSA key put in the chip during its production) or another 'trusted' key. RSA is the represents the surnames of Ron Rivest, Adi Shamir and Len Adleman whom publicly described the algorithm.

In the present embodiment, TPM 190 comprises a number of platform configuration registers (PCRs). TPM 190 is illustrated with two of the registers, PCR4 and PCR7, for purposes of the discussion. In other embodiments, TPM 190 may have only two registers. In further embodiments, TPM may access registers external to TPM 190.

System 100 may be controlled, at least in part, by input from conventional input devices, such as a keyboard, a pointing device such as a mouse, etc. Input devices may communicate with system 100 via I/O devices 184, for example. I/O devices 184 may be one or more ports for communication with external I/O devices and may comprise I/O devices such as modems, drive controllers, compact disk drives, hard disk drives, more mass storage devices, or the like. The storage devices may include, for instance, integrated drive electronics (IDE), small computer system interface (SCSI), and serial advanced technology architecture (SATA) hard drives. The storage devices may also include other devices or media, such as floppy disks, optical storage, tapes, flash memory, memory sticks, compact flash (CF) cards, digital video disks (DVDs), etc.

System 100 may also respond to directives or other types of information received from other processing systems or other input sources or signals. System 100 may utilize one or more connections to one or more remote processing systems, for example through a network interface controller (NIC) 182, a modem, or other communication ports or couplings. System 100 may interconnect with other systems via a physical and/or logical network, such as a local area network (LAN), a wide area network (WAN), an intranet, the Internet, etc. Communications may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Some components, such as NIC 182, for example, may be implemented as adapter cards with interfaces (e.g., a PCI connector) for communicating with a bus. Alternatively, NIC 182 and other devices may be implemented as on-board or embedded controllers, using components such as programmable or non-programmable logic devices or arrays, application-specific integrated circuits (ASICs), embedded processors, smart cards, etc.

For purposes of this disclosure, the term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations. For instance, RAM 164, ROM 174, and I/O devices 184 may include various sets of instructions which, when executed, perform various operations. Such sets of instructions may be referred to in general as software or code.

Figure 2:
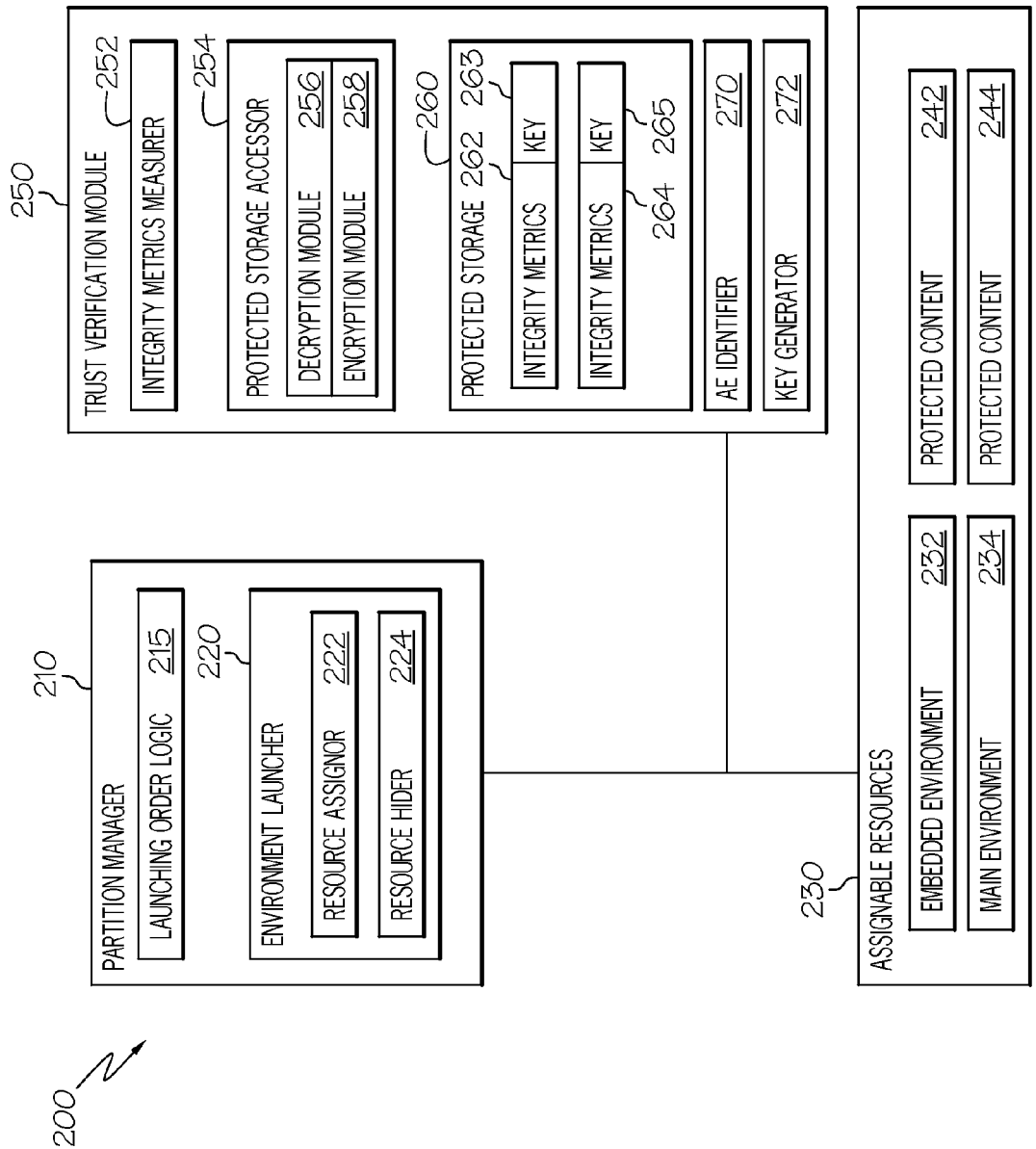
FIG. 2 depicts an embodiment of a system to launch one or more trusted, embedded environments prior to launching an OS in a main partition with a protected core.

FIG. 2 depicts an embodiment of a system 200 to launch one or more trusted, runtime environments that coexist with a main runtime environment with a protected core prior to launching an OS in the main runtime environment. System 200 may comprise a partition manager 210, assignable resources 230, and a trust verification module 250. Partition manager 210 may comprise logic such as code and/or state machines that are designed to provide a core root of trust for measurement of system 200. In particular, partition manager 210 may comprise trustworthy code that can be authenticated via trust verification module 250. Furthermore, partition manager 210 can be trusted to maintain the integrity of a chain of trust for runtime environments and subsequently launched code.

Partition manager 210 may comprise launching order logic 215 and an environment launcher 220. Launching order logic 215 may comprise logic such as hardware and/or software to define an order of operations to launch runtime environments such as embedded environment 232 and main environment 234. Environment launcher 220 may comprise logic to assign hardware resources such as memory units and processing units to environments as well as a code loader to load firmware or an OS into an environment. For instance, launching order logic 215 may initiate operations to configure embedded environment 232 by allocating assignable resources 230 to embedded environment 232. In particular, launching order logic 215 may invoke resource assignor 222 of environment launcher 220 to assign memory units, processor units, and other hardware resources to embedded environment 232. Environment launcher 220 may then load firmware to load an OS into embedded environment 232 or load the OS into embedded environment 232. In many embodiments, resource hider 224 may hide hardware resources of embedded environment. In some embodiments, resource hider 224 may hide the resources after loading the firmware or OS into embedded environment 232, while in further embodiments, resource hider 224 may hide the resources before loading and verifying the current integrity metrics of embedded environment 232. Resource hider 224 may hide resources via schemes available in the hardware such as by blocking an OSs ability to discover the resource during initialization of the OS.

Upon loading the firmware or the OS into embedded environment 232, trust verification module 250 may verify the current integrity metrics of embedded environment 232 against integrity metrics 262 prior to providing the firmware or OS of embedded environment 232 with a key 263 from protected storage 260. If trust verification module 250 verifies the current integrity metrics of embedded environment 232, the firmware or OS of embedded environment 232 may utilize key 263 to decrypt protected content 242 for use within embedded environment 232. In some embodiments, key 263 may also be useful to encrypt and store data and/or processes into protected content 242. In other embodiments, embedded environment 232 may modify content in or encrypt new content for protected content 242 via trust verification module 250.

In several embodiments, launching order logic 215 may at least begin to launch main environment 234 while configuring or launching embedded environment 232. For example, launching order logic 215 may configure main environment 234 substantially simultaneously with configuring embedded partition 232. In further embodiments, launching order logic 215 may begin configuration of main environment 234 after verification of the current integrity metrics of embedded environment 232. In several embodiments, more than one embedded environment such as embedded environment 232 may be configured and/or launched prior to launching an OS in main environment 234.

Launching order logic 215 may initiate the launch of main environment 234 in a manner similar to that of embedded environment 232. For example, launching order logic 215 may instruct environment launcher 220 to configure the hardware resources of main environment 234 and then load code that can be authenticated to initiate a chain of trust within main environment 234. The chain of trust may encompass a protected core within main environment 234 that comprises a trusted OS kernel and trusted processes and/or data from protected content 244.

After establishing and hiding the protected core, an OS may be launched within main environment 234 in resources outside of the protected core. For instance, the OS may be a general purpose OS. In other embodiments, the OS may be a specific purpose OS such as an OS to control mechanical functionality of a digital video recorder (DVR). For example, the DVR may include a hard drive to recorder television shows as well as a protected core with functionality to facilitate access to premium video content. The specific purpose OS may include logic to receive and interpret instructions from a user to play and record digital video content while the OS kernel in the protected core may include functionality to interact with the specific purpose OS to purchase and play premium digital video content. In such embodiments, embedded environment 232, may, for instance, comprise logic to download, interpret, and stream the premium digital video content to the protected core.

Assignable resources 230 may represent logical and/or physical hardware resources that may be assigned to a runtime environment such as embedded environment 232 and main environment 234. Assignable resources 230 may include processor cores, RAM, ROM, a memory controller hub, an I/O controller hub, busses, I/O interfaces, and the like.

Assignable resources 230 comprise embedded environment 232, main environment 234, protected content 242, and protected content 244. Embedded environment 232 may represent hardware and code that comprise an embedded runtime environment. Similarly, main environment 234 may comprise hardware and code that make up the main partition of the system 200. Protected content 242 may comprise data and/or processes for use by embedded environment 232 upon verification of the current integrity metrics of embedded environment 232. Protected content 242 is encrypted and may be decrypted via key 263. Protected content 244 may comprise data and/or processes for use by main environment 234 upon verification of the current integrity metrics of main environment 234 or at least the protected core of main environment 234. Protected content 244 is encrypted and may be decrypted via key 265.

Trust verification module 250 comprises logic such as hardware and/or software to verify current integrity metrics of environments prior to releasing keys such as keys 263 and 265. Keys such as keys 263 and 265 allow corresponding environments to access data and/or processes stored in protected data storage areas of, e.g., hard disks, RAM, flash memory, or other non-volatile and volatile memory, such as protected content 242 and protected content 244. In some embodiments, trust verification module comprises a TPM such as the TPM describe in conjunction with FIG. 1.

Trust verification module 250 comprises an integrity metrics measurer 252, a protected storage accessor 254, protected storage 260, an approved environment identifier 270, and a key generator 272. Integrity metrics measurer 252 may measure current integrity metrics of a runtime environment such as embedded environment 232 and pass the integrity metrics to protected storage accessor 254. Integrity metrics measurer 252 may measure integrity metrics such as software and hardware assignments associated with the runtime environment to generate a summary of the environment that identifies the environment in a substantially unique way. The process of measuring integrity metrics is designed to result in a different measurement if code or hardware configurations of the runtime environment change such as by the introduction of a virus or hardware into the environment. In some embodiments, measurements accommodate insignificant changes to an environment such as the assignment of a different physical or logical block of memory, a different channel of communication, or the like.

Protected storage accessor 254 may receive integrity metrics from integrity metrics measurer 252 and either verify the metrics against metrics in protected storage 260 or store the metrics in protected storage 260. For instance, if approved environment (AE) identifier 270 indicates that a runtime environment, such as embedded environment 232, is an approved environment for storing trusted integrity metrics 262, a key generator 272 may generate key 263 for encrypting protected content 242 and encryption module 258 of protected storage accessor 254 may encrypt key 263 with integrity metrics 262. Protected storage accessor 254 may then store key 263 in protected storage 260.

On the other hand, if AE identifier 270 does not identify embedded environment 232 as an approved environment for measuring trusted integrity metrics 262, decryption module 256 of protected storage accessor 254 may compare the measured integrity metrics for embedded environment 232 against integrity metrics 262 to determine whether to provide embedded environment with key 263. If the current integrity metrics do not match integrity metrics 262, then key 263 may not be returned to embedded environment 232.

Protected storage 260 may comprises registers or other memory to store keys sealed against integrity metrics. In many embodiments, protected storage 260 is not accessible to hardware external to trust verification module 250. In further embodiments, access to protected storage 260 is substantially limited to accesses via protected storage accessor 254.

Protected storage 260 may comprise registers represented by integrity metrics 262 and 264. In many embodiments, at least one of the registers is designated for usage by a manufacturer and/or not for usage by an OS or other such software.

AE identifier 270 may comprise logic to identify an approved environment such as the MAE described in conjunction with FIG. 1. An approved environment may be an environment that may be created through the introduction of hardware, one or more signals, or the like. In many embodiments, the approved environment may only be accomplished during manufacturer of system 200. In other embodiments, the approved environment may be accomplished after manufacturer or after deployment of system 200.

Key generator 272 may comprise a generator that creates cryptographic keys. For example, key generator 272 may generate 40-bit keys, 128-bit keys, 512-bit keys, or the like to encrypt data and processes for protected content 242 and 244. The keys may be symmetrical or asymmetrical such as public and private keys implemented in many contemporary cryptographic applications.

Figure 3:
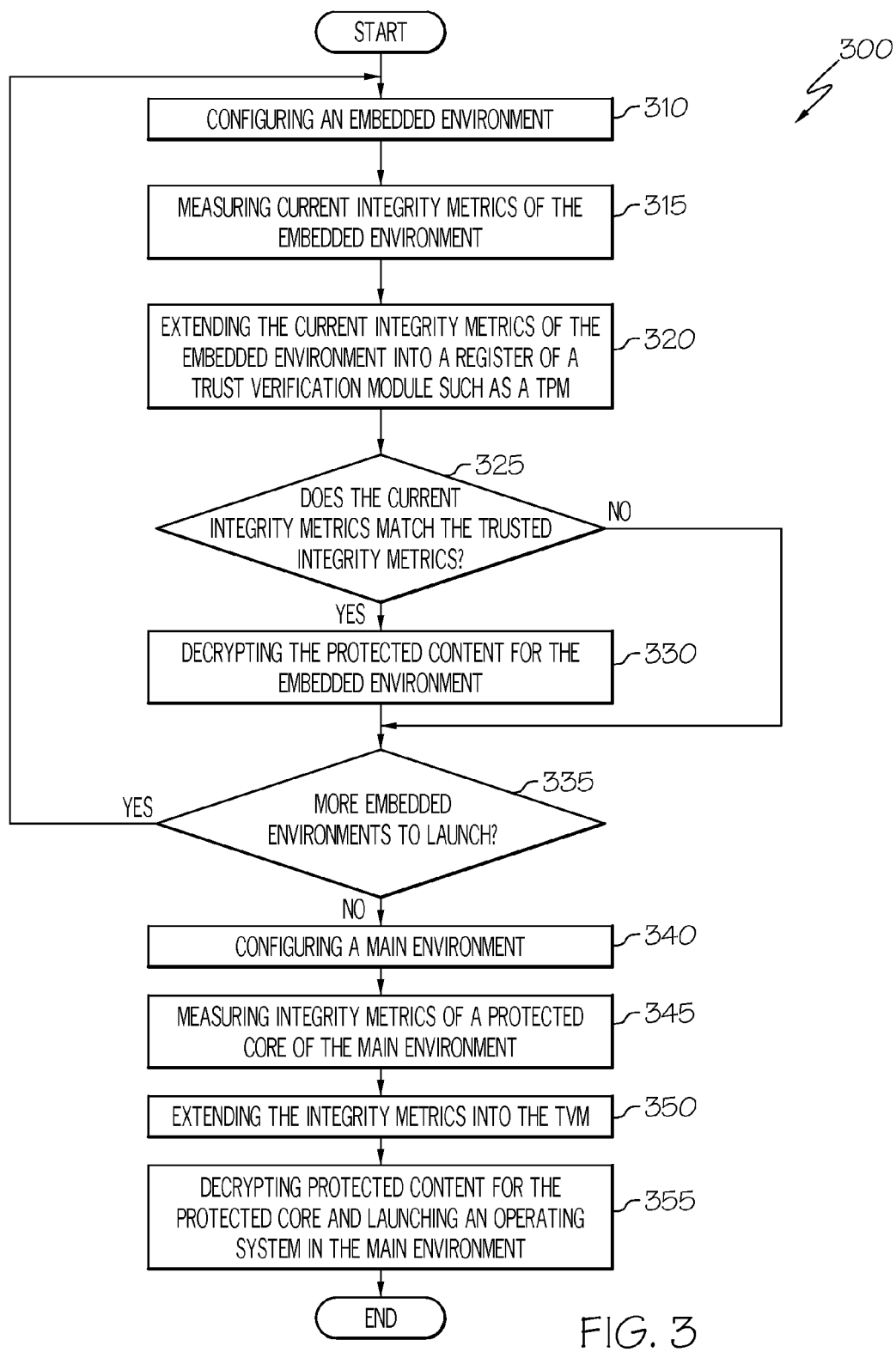
FIG. 3 depicts a flowchart of an embodiment to launch one or more trusted, coexistent partitions.

FIG. 3 depicts a flowchart 300 of an embodiment to launch one or more trusted, coexistent partitions. More specifically, flowchart 300 illustrates a process for configuring runtime environments in partitions in a trusted manner and launching operating systems within the partitions of a processing system such as the processing system described in conjunction with FIG. 1. Flowchart 300 begins with configuring an embedded environment (element 310). Configuring the embedded environment may entail assigning or allocating hardware resources to the partition, loading firmware or software into the partition, and, in some embodiments, hiding the hardware resources for the partition. For example, configuring the embedded environment may involve allocating a portion of RAM to the embedded system in physical or logical units, allocating a portion of processing cycles to the embedded system in physical or logical units, assigning a number of physical and/or logical ports for communication as well as assigning other resources to the embedded environment.

Once the embedded environment is configured, a trust verification module such as a TPM may measure current integrity metrics of the embedded environment (element 315). Measuring the embedded environment may include hashing the software and hardware resources of the environment to create a summary of the environment.

After measuring the current integrity metrics, the trust verification module may extend the current integrity metrics of the embedded environment into a register of the trust verification module (element 320). Extension of the current integrity metrics into the register may hash the current integrity metrics with the content of the register. If the current integrity metrics match the trusted integrity metrics for the embedded environment (element 325), the trust verification module may release a key and the embedded environment may then decrypt the protected content for usage within the embedded environment (element 330).

On the other hand, if the current integrity metrics do not match the trusted integrity metrics for the embedded environment (element 325), the trust verification module may not release the key and the embedded environment may not decrypt the protected content. In present embodiment, the request for the key is then ignored and the embedded environment may not access the protected content until the processing system is rebooted or reset. In other embodiments, the embedded environment may be re-established or re-configured and make one or possibly more attempts to match the trusted integrity metrics.

In the present embodiment, once the integrity metrics of the embedded environment are verified or fail to verify, a partition manager may restart the process from element 310 if more embedded environments are scheduled to launch (element 335). If no other embedded environments are scheduled to launch, the partition manager initiates configuration of the main environment (element 340). In other embodiments, embedded environments may be configured and/or launched substantially simultaneously. In further embodiments, the main partition may also be configured substantially simultaneously. In some embodiments, however, the OS for the main environment may not be launched until the embedded environments have been launched.

Once the main environment, or at least a protected core of the main environment, is configured, a trust verification module such as a TPM may measure current integrity metrics of the main environment (element 345). Measuring the main environment may include hashing the software and hardware resources of the environment to create a summary of the environment.

After measuring the current integrity metrics, the trust verification module may extend the current integrity metrics into a register of the trust verification module (element 350). Extension of the current integrity metrics into the register may hash the current integrity metrics with the content of the register. If the current integrity metrics match the trusted integrity metrics for the main environment, the trust verification module may release a key and the main environment may then decrypt the protected content for usage within the protected core of the main environment and launch an OS within the main environment (element 355).

Figure 4:
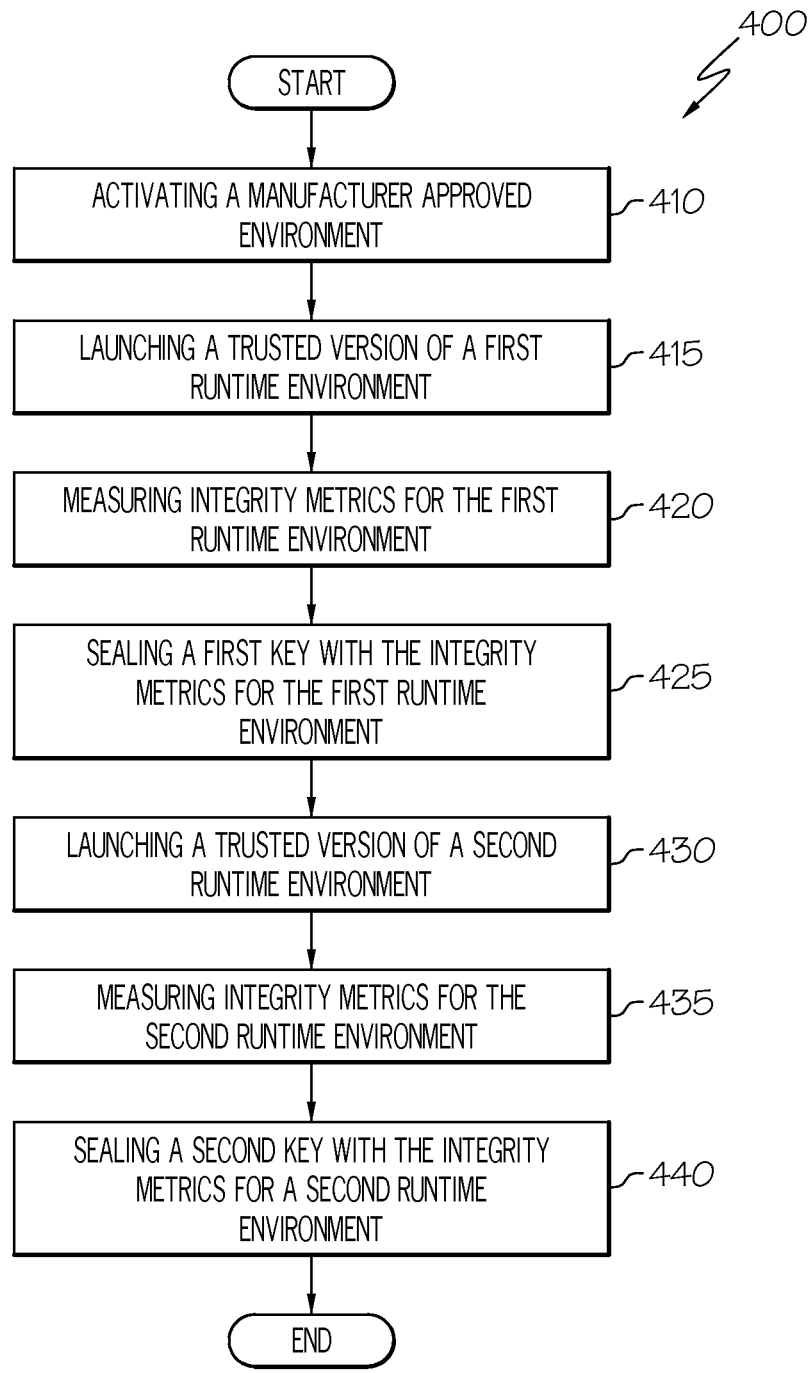
FIG. 4 depicts a flowchart of an embodiment to facilitate the launch of one or more trusted contemporaneous partitions.

FIG. 4 depicts a flowchart 400 of an embodiment to facilitate the launch of one or more trusted contemporaneous partitions. Flowchart 400 may describe operations performed on and/or by a processing system to establish trusted integrity metrics for various environments to coexist on processing system. Flowchart 400 begins with activating a manufacturer-approved environment (element 410). For example, activating the manufacturer-approved environment may involve electrically interconnecting two or more contacts on the motherboard of the processing system, introducing a particular signal or pattern of signals at particular points on the motherboard, or other process.

After activating the MAE or substantially simultaneously with establishing a MAE, the processing system may launch a trusted version of the first environment (element 415). For instance, a compact disk (CD) may be inserted into a drive of the processing system to configure the first environment and install a clean, trusted version of the software for the first environment. A TPM of the processing system may then measure integrity metrics for the first environment and generate a first key for the first environment (element 420). After generating the first key, the TPM may seal the first key with the integrity metrics for the first environment in a platform configuration register (PCR) such as PCR7 (element 425). The first environment integrity metrics may be stored in PCR7 in some embodiments because the content of PCR7 is substantially left to the control of the manufacturer of the processing system or at least important components thereof such as processors and chipsets.

After activating the MAE or substantially simultaneously with establishing a MAE, the processing system may also launch a trusted version of the second environment (element 430). For instance, the compact disk (CD) may also configure the second environment and install a clean, trusted version of the software for the second environment. The TPM of the processing system may then measure integrity metrics for the second environment and generate a second key for the second environment (element 435). After generating the second key, the TPM may seal the second key with the integrity metrics for the second environment in a platform configuration register (PCR) such as PCR4 (element 440).

Another embodiment of the invention is implemented as a program product for use with a system to perform processes such as the processes described in conjunction with system 100 as illustrated in FIG. 1 or other embodiments described in FIGS. 2-4. The program(s) of the program product defines functions of the embodiments (including the methods described herein) and can be contained on a variety of data and/or signal-bearing media, often referred to as machine-accessible media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., a Universal Serial Bus (USB) flash drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems and arrangements to launch trusted, coexisting, runtime environments on a processing system. It is understood that the form of the invention shown and described in the detailed description and the drawings are to be taken merely as examples. It is intended that the following claims be interpreted broadly to embrace all the variations of the embodiments disclosed.

Although some embodiments of the present invention have been described in detail, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system to launch trusted, co-existing environments, the system comprising:
  resources to support partitions for at least a first embedded environment and a second embedded environment, the resources comprising data storage with a first protected area and a second protected area;
  a trusted platform module (TPM) comprising hardware, the TPM comprising a first register, the TPM to unseal a first key in response to extension of a measurement of integrity metrics of a first embedded environment into the first register and to unseal a second key in response to extension of a measurement of integrity metrics of a second embedded environment into the first register; and
  a partition manager to request extension of the measurement of integrity metrics of the first embedded environment into the first register, to decrypt data in the first protected area with the first key, to request extension of the measurement of integrity metrics of the second embedded environment into the first register, and to decrypt data in the second protected area with the second key, wherein the partition manager comprises logic to define an order of operations to launch the embedded environments, wherein the order of operations comprises extension of measurement of integrity metrics of each of the embedded environments sequentially.

2. The system of claim 1, further comprising an approved environment identifier to identify an indication of an approved environment.

3. The system of claim 2, wherein the TPM is configured to recognize the existence of the approved environment identified by the approved environment identifier and to generate and seal the first key for the first embedded environment with the integrity metrics in response to an extension of a measurement of the integrity metrics for first embedded environment into the first register.

4. The system of claim 2, wherein the TPM is configured to seal the first key by encryption of the first key with a hash of integrity metrics of a trusted version of the first embedded environment.

5. The system of claim 2, wherein the TPM is further configured to seal one or more additional keys in the first register for one or more additional embedded environments, wherein control over content of the first register is designated for a manufacturer associated with the processing system.

6. The system of claim 2, wherein the approved environment identifier is configured to identify the approved environment in response to connection of contacts on a board of the processing system.

7. The system of claim 1, wherein the data storage comprises a host-protected access (HPA) region of a hard disk.

8. The system of claim 1, wherein the TPM comprises platform configuration registers, wherein the first register comprises platform configuration register seven (PCR7) or platform configuration register four (PCR4).

9. The system of claim 1, wherein the partition manager comprises firmware.

10. The system of claim 1, wherein the partition manager comprises microcode of a processor in the system.

11. The system of claim 1, wherein the partition manager comprises logic to launch the first embedded environment, the second embedded environment, and one or more additional coexistent embedded environments before releasing control of remaining resources to an operating system in a main environment.

12. A machine-accessible storage medium, wherein the medium is not a signal, the medium containing instructions, which when executed by a processing system, cause the processing system to perform operations, the operations comprising:

configuring a first embedded environment on a processing system, the first embedded environment to manage access to protected content of the first embedded environment;

extending a measurement of current integrity metrics of the first embedded environment into a first register of a trusted platform module (TPM) to compare the current integrity metrics of the first embedded environment against trusted integrity metrics for the first embedded environment, the TPM to unseal a first key in response to verification of the measurement of the current integrity metrics of the first embedded environment, wherein the TPM comprises hardware;

decrypting the protected content for the first embedded environment via the first key; and launching a second embedded environment after the verification of the measurement of the current integrity metrics of the first embedded environment, after verification of a measurement of current integrity metrics for the second embedded environment, the TPM to unseal a second key in response to extension of the measurement of the current integrity metrics of the second embedded environment into the first register, the second embedded environment to coexist with the first embedded environment on the processing system, wherein the embedded environments are launched in accordance with an order of operations, wherein the order of operations comprises extension of measurement of integrity metrics of each of the embedded environments sequentially.

13. The machine-accessible storage medium of claim 12, wherein the operations further comprise receiving one or more additional keys for one or more additional embedded environments after extending current integrity metrics for one or more additional embedded environments.

14. The machine-accessible storage medium of claim 12, wherein configuring the first embedded environment comprises hiding the resources assigned to the first embedded environment.

15. The machine-accessible storage medium of claim 12, wherein extending the measurement of the current integrity metrics of the first embedded environment comprises extending the measurement of the current integrity metrics into platform configuration register seven (PCR7) of the TPM and wherein launching the second embedded environment comprises extending the measurement of integrity metrics of the second embedded environment into PCR7 of the TPM.

16. The machine-accessible storage medium of claim 12, wherein launching the second environment comprises:

configuring the second embedded environment to coexist with the first embedded environment and extending a hash of integrity metrics of the second embedded environment into PCR4 of the TPM after extending the current integrity metrics of the first embedded environment into PCR4 of the TPM.

\* \* \* \* \*